United States Patent
Meijer et al.

(10) Patent No.: US 8,782,060 B2
(45) Date of Patent: Jul. 15, 2014

(54) MULTIPLE PHASE CONTENT INGEST

(75) Inventors: Paul Meijer, Seattle, WA (US); Mark Heilkamp, Seattle, WA (US)

(73) Assignee: ThePlatform For Media, Inc., Seattle, WA (US)

( * ) Notice: Subject to any disclaimer, the term of this patent is extended or adjusted under 35 U.S.C. 154(b) by 144 days.

(21) Appl. No.: 13/446,535

(22) Filed: Apr. 13, 2012

(65) Prior Publication Data

US 2013/0275443 A1    Oct. 17, 2013

(51) Int. Cl.
*G06F 17/00*    (2006.01)

(52) U.S. Cl.
USPC ............. 707/754; 707/736; 707/758; 706/12; 706/14

(58) Field of Classification Search
None
See application file for complete search history.

(56) References Cited

U.S. PATENT DOCUMENTS

| | | | |
|---|---|---|---|
| 7,219,330 B2 * | 5/2007 | Hogg et al. | 717/106 |
| 7,743,363 B2 * | 6/2010 | Brumme et al. | 717/120 |
| 8,104,025 B2 * | 1/2012 | Hogg et al. | 717/140 |
| 8,230,393 B2 * | 7/2012 | Bird et al. | 717/120 |
| 2002/0184227 A1 * | 12/2002 | Tobi et al. | 707/101 |
| 2004/0268305 A1 * | 12/2004 | Hogg et al. | 717/109 |
| 2007/0088710 A1 * | 4/2007 | Song et al. | 707/10 |
| 2007/0088716 A1 * | 4/2007 | Brumme et al. | 707/100 |
| 2007/0198972 A1 * | 8/2007 | Hogg et al. | 717/140 |
| 2008/0027908 A1 * | 1/2008 | Durbeck et al. | 707/2 |
| 2009/0217322 A1 * | 8/2009 | Hindle | 725/39 |
| 2010/0169910 A1 * | 7/2010 | Collins et al. | 725/14 |
| 2012/0236005 A1 * | 9/2012 | Clifton et al. | 345/473 |
| 2013/0117291 A1 * | 5/2013 | Roy-Faderman | 707/756 |
| 2013/0151364 A1 * | 6/2013 | Reed, Jr. et al. | 705/26.1 |
| 2013/0166580 A1 * | 6/2013 | Maharajh et al. | 707/758 |
| 2013/0254897 A1 * | 9/2013 | Reedy et al. | 726/26 |

* cited by examiner

*Primary Examiner* — Hung Le
(74) *Attorney, Agent, or Firm* — Ballard Spahr LLP

(57) ABSTRACT

Content ingest can comprise the storage of content and the logging of the descriptive and technical metadata necessary to identify and locate the content. The methods and systems provided herein relate to content ingest utilizing multiple phase processing to account for both standard and non-standard metadata.

20 Claims, 7 Drawing Sheets

FIG. 2

```xml
<?xml version="1.0" encoding="UTF-8"?>
<rss version="2.0"
 xmlns:dcterms="http://purl.org/dc/terms/"
 xmlns:media="http://search.yahoo.com/mrss/"
 xmlns:plingestmf="http://xml.website.com/ingest/data/IngestFile"
 xmlns:plfile="http://xml.website.com/media/data/MediaFile"
 xmlns:plmedia="http://xml.website.com/media/data/Media"
 xmlns:customNS="http://customfield.sample.com">
  <channel>
    <item>
      <author>Media item creator.</author>                           ← 201
      <description>Media item description.</description>             ← 202
      <title>Media item title.</title>
      <media:copyright url="http://www.example.com">© 2008
        </media:copyright>
      <media:credit role="author" scheme="urn:nabu">
            the Peach Open Movie Project</media:credit>
      <media:keywords>Bunnies, Cute</media:keywords>
      <media:rating scheme="urn:mpaa">G</media:rating>
      <media:category>Bunnies</media:category>
      <plmedia:categoryId>
         http://mps.website.com/data/Category/0123456789
      </plmedia:categoryId>                                          ← 203
      <customNS:fieldName>Custom field.</customNS:fieldName>
      <plmedia:approved>true</plmedia:approved>
      <dcterms:valid>start=2008-01-01T00:00:00Z;end=2009-01-01T00:00:00Z;scheme=W3C-DTF</dcterms:valid>
      <media:group>
        <media:content expression="full" isDefault="true" lang="en"
              url="ftp://server.example.com/file.flv">
          <media:hash algo="md5">dfdec888b72151965a34b4b59031290a
          </media:hash>
          <plfile:allowRelease>true</plfile:allowRelease>
          <plfile:assetType>Animation</plfile:assetType>
          <plfile:assetType>Movie</plfile:assetType>
          <plingestmf:ingestOptions method="Move"
              applyTransformId=
              "http://mps.website.com/data/TaskTemplate/123"
              analyze="true" />
        </media:content>
      </media:group>
      <media:thumbnail isDefault="true" height="60" width="60"
              url="ftp://server.example.com/file.flv.thumb.png">
        <plfile:allowRelease>true</plfile:allowRelease>
      </media:thumbnail>
    </item>
  </channel>
</rss>
```

MULTIPLE PHASE CONTENT INGEST

BACKGROUND

Video management systems utilize standard formats and feeds to express media characteristics. Ingest services are used to extract these media characteristics and translate them into media objects, video, and thumbnails. However, standard formats are typically extensible and non-standard elements are often introduced that cannot be extracted by the ingest service, or may contain standard elements that are undesired but extracted nonetheless. There is a need for a system to take advantage of standard formats to quickly ingest media while allowing for custom ingest alteration.

SUMMARY

It is to be understood that both the following general description and the following detailed description are exemplary and explanatory only and are not restrictive, as claimed.

In an aspect, provided are methods and systems for content ingest comprising receiving content, wherein the content comprises standardized metadata, providing the content to a device configured to process the standardized metadata and generating a first content object. The disclosure also provides for processing the first content object according to a pre-defined set of processing rules and generating a second content object, and committing the second content object into a content management system.

In another aspect, provided are methods for content ingest comprising receiving content comprising standard elements and non-standard elements, applying a first filter to process the standard elements, applying a second filter to process the non-standard elements, generating a content object according to the processed standard and non-standard elements, and committing the content object into a content management system.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2 is example metadata;

DETAILED DESCRIPTION

Figure 1:
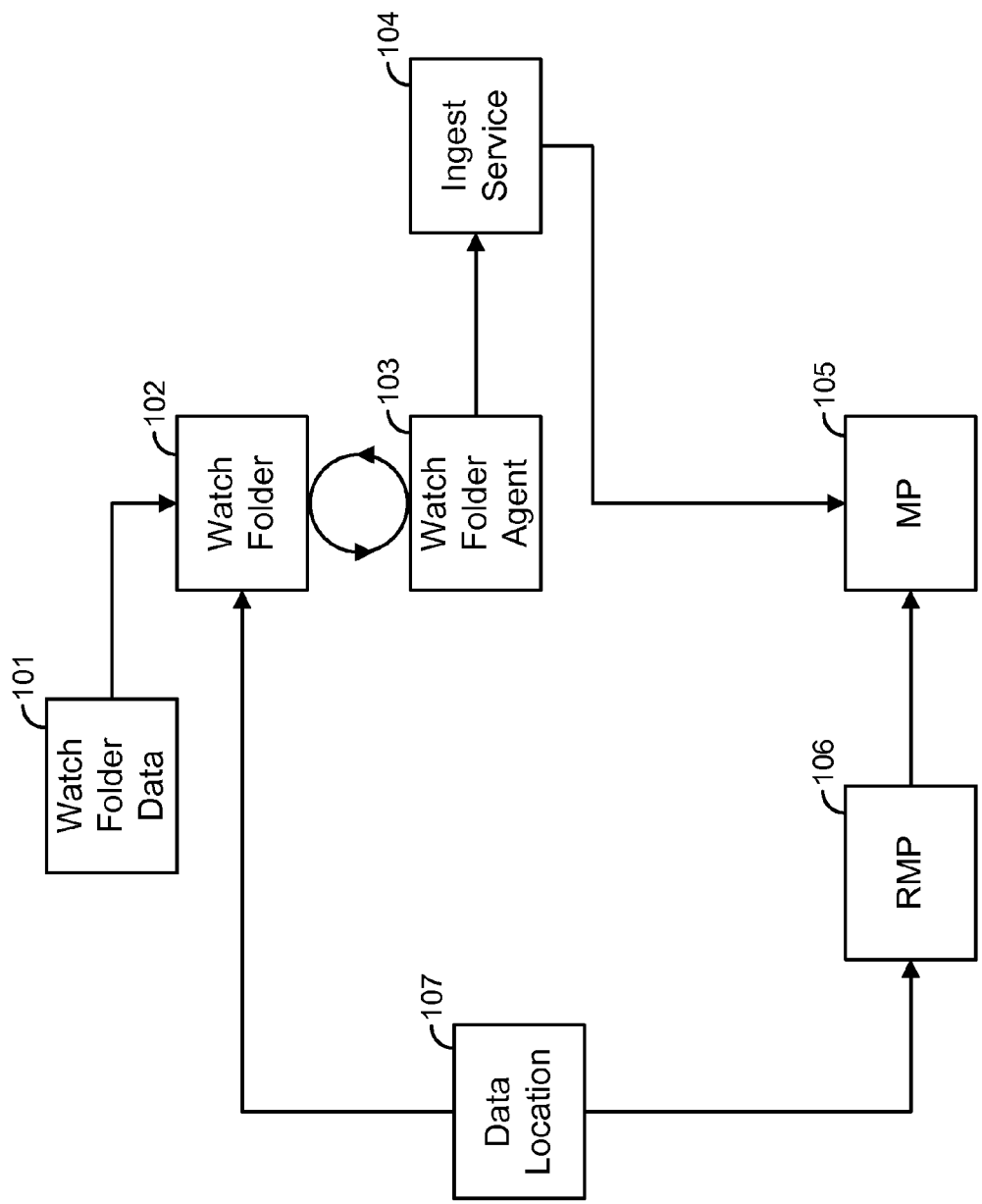
FIG. 1 is an example operating environment.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, ingest can comprise receiving and/or storing content and the logging of the descriptive and technical metadata necessary to identify and locate the content, which may be audio, video, data or any other content or asset. The content or asset may reside anywhere in a network, such as in a transmission infrastructure of a media asset management system/application. As used herein, content can be any type of data, for example, video, audio, textual, combinations thereof, and the like. The methods and systems provided herein relate to content ingest utilizing multiple phase processing to account for both standard and non-standard metadata.

In an aspect, standard elements can comprise tags corresponding to metadata adhering to a recognized standard, for example, one or more of RSS, mRSS, AddContent, Cablelabs® ADI, TV-Anytime, and the like. Non-standard elements can comprise tags corresponding to metadata that do not adhere to a recognized standard. The non-standard elements can be any custom tag, descriptor, information, etc., desired by a user that is absent or unused from a recognized standard. In an aspect, the standard and non-standard elements can be contained within a single content file. The standard and/or non-standard elements can include a location of associated audio and/or video content. The methods can further comprise retrieving the audio and/or video content according to the location information contained with the metadata. The methods can automatically retrieve content utilizing watch folders and/or feed readers as described herein.

Content ingest can be performed such that the variety of delivery channels needed is taken into account through repurposing. For example, source content can be edited, graphics added and scene transition effects added for repurposing. An ingest system can support multiple types of transmission, for example, an OTA multicast or a network that simultaneously delivers more than one channel, Web distribution, distribution from remote devices, and the like.

The video distribution industry, for example, involves managing a plurality of decisions and tasks, including advertising, supported players, syndication, and the like. However, of primary significance is getting media into a system capable of implementing those decisions and tasks. The ingest methods and systems provided can accommodate automation, large content libraries, and constant changes to media metadata. The ingest methods and systems provided can adapt to the needs of the user, rather than requiring the user to adapt to the system. The ingest methods and systems enable a user to upload, update, and delete high-volume content and video metadata.

In an aspect, the disclosed ingest methods and systems support multiple phase content ingest. In a further aspect, the methods and systems can utilize automated content upload. For example, predetermined storage locations, referred to herein as "watch folders," can be utilized. FIG. 1 illustrates an exemplary ingest service utilizing watch folders. Watch folders can be FTP locations (or any other storage location) that can be monitored for changes. Watch Folders are a "pull" ingest method: a user places media in the folder and the media is automatically uploaded to a media publishing system (MP), also referred to as a content management system. A user places watch folder data 101 in a storage location that is predefined as a known watch folder location. An agent 103 monitors the watch folder data 101. Agent 103 can check folder contents at preset intervals for new files, for example. When agent 103 finds a new file or data in the watch folder 102—either a standalone content file or a metadata file that describes content objects and their new content files—the agent 103 informs Ingest Service 104 of the location of the watch folder 102 and the names of the files in the watch folder data 101 to ingest. The Ingest Service 104, which can be a combination of computing devices and associated software, processes the metadata associated with the content and commits the content to the MP 105. Ingest Service 104 can utilize multiple phases of processing to ingest the content into the MP 105. By way of example, Ingest Service 104 can process both standard and non-standard metadata associated with content to ingest the content. Furthermore, Ingest Service 104 can process standard metadata in a first phase and further manipulate the content and/or the standard metadata, according to a predefined set of processing rules. The content files, such as audio, video, data, and combinations thereof, can then be retrieved from the watch folder, or other location such as data location 107, specified by the metadata, by a computing device such as a Remote Media Processor (RMP) server 106 and added to the MP 105.

In another aspect, a feed reader can be utilized instead of, or in addition to, watch folders for automatic content upload. A feed reader can monitor a feed, for example, feeds such as RSS, mRSS, AddContent, Cablelabs® ADI, TV-Anytime, and the like or others, and automatically upload content additions and changes to the MP 105. The feed reader is also a "pull" ingest method: the upload is initiated by feeds in the user system. The feed reader can utilize an agent that monitors the files in a user created feed. When the feed reader agent retrieves data from a feed, it passes the feed content directly, or as efficiently as possible, to the Ingest Service 104 for processing as described above. The Ingest Service 104 then adds the metadata to the MP 105, and the content files can be retrieved from data location 107 by an RMP server 106 and added to the MP 105.

In a further aspect, content can be ingested into an MP 105 by manual upload; a "push" ingest method. For example, a user can manually upload content through a web interface to the MP.

In an aspect, the ingest methods and systems provided can utilize one or more ingest devices such as adapters, or filters, as part of Ingest Service 104. An ingest adapter can be software or hardware that processes metadata associated with content and/or manipulates the content. In an aspect, configurable "adapter" scripts can be used to convert metadata into a format that is readable by an MP 105. An ingest adapter can be configured to process metadata generated according to a recognized standard, for example, MRSS, XML, CSV, and the like. An ingest adapter can be configured to process customized metadata that do not adhere to a recognized standard. For example, metadata that is generated according to user preferences. Furthermore, an ingest adapter can be configured to add/edit/delete any data contained within standardized metadata.

FIG. 2 provides an example of metadata that can be processed by one or more ingest adapters. The metadata shown in FIG. 2 are representative of both standard and non-standard metadata. Items 201 and 202 are examples of standard metadata, while item 203 is an example of non-standard metadata.

Figure 3:
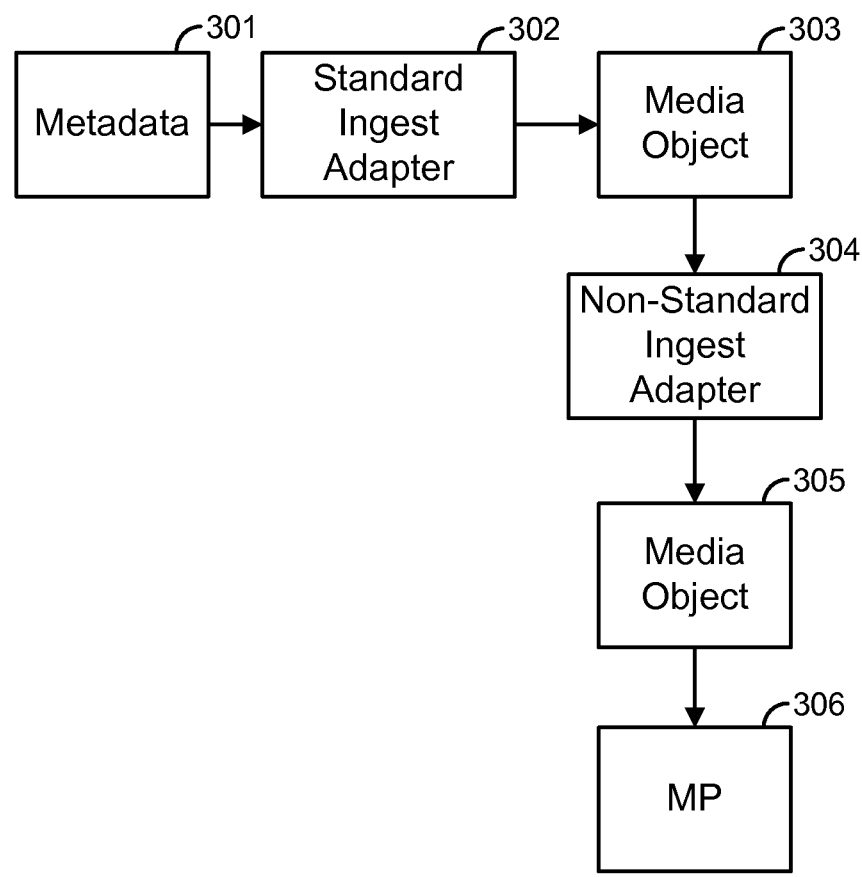
FIG. 3 is a block diagram of an example process flow for multiple phase content ingest.

In an aspect, illustrated in FIG. 3, provided are methods and systems for multiple phase content ingest. Metadata 301 can be received either automatically or manually or as in the examples described herein. Metadata can be any data that describes content attributes. A standard ingest adapter 302 can parse the metadata 301 to construct a media object 303. The standard ingest adapter 302 can be configured to process metadata generated according to a recognized standard, such as MRSS and the like, converting the data into a media object. A media object represents a collection of related content files, thumbnails, and metadata. In an aspect, a media object can be an object oriented representation of sets of metadata. The MP system can define what the elements are for a media object versus those for a media file. For instance, the example in FIG. 2 can be converted into a media object containing information about author, description title, category and other metadata. Additionally, a first embedded media file object can comprise information, for example, about a "FLV" video file, information about the storage location, the asset type, whether the content can be released to end users and instructions for encoding the file. A second embedded media file object can comprise information, for example, about a "PNG" thumbnail file. In an aspect, a set of (standard and non-standard) metadata can be grouped into an object if the metadata pertain to the same entity (e.g. video, audio, data, and combinations thereof). Similarly other sets of (standard and non-standard) metadata can be grouped into media file objects because the metadata belong together. For example, FIG. 2 illustrates one metadata file which can be parsed into sets of objects. "Title" is a property of media, not of the individual files, but the files relate back to the media and can thus can be embedded. One file can describe the image for the media, while the other can describe the playable flash video file. The media object 303, can then be further processed by a non-standard ingest adapter 304. The non-standard ingest adapter 304 can be configured to process any additional or customized metadata that is not processed by the standard ingest adapter 302, resulting in media object 305. In an aspect, the non-standard ingest adapter 304 can manipulate the metadata, including both standard and non-standard elements within the metadata.

Referring back to FIG. 2, a custom field value may be remapped to a known namespace and/or field name. By way of example, other details may be altered such as adding asset types to the thumbnail file or creating a new media field such as "short description" and populating it with, for example, the first ten characters of the ingested description. The non-standard ingest adapter 304 can commit the media object 305 to the MP 306.

Figure 4:
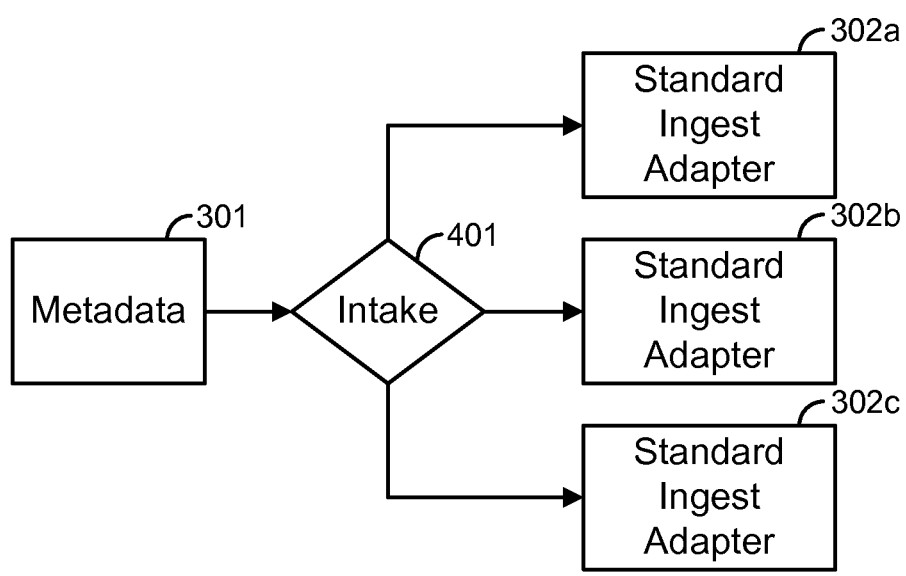
FIG. 4 is a block diagram of an example process flow for content ingest in an environment supporting multiple standard ingest devices.

In a further aspect, illustrated in FIG. 4, before metadata 301 can be processed by a standard ingest adapter, an intake process 401 determines the standard used to generate metadata 301 and routes the metadata 301 to a standard ingest adapter 302a, b, c configured for the identified standard. In an aspect, intake process 401 can be configured to operate in conjunction with one or more watch folders by identifying the extension of the metadata file to determine which adapter to use. For example, if the file extension is ".mrss", intake process 401 can relay the file to an mRSS adapter; if the file extension is ".addContent", intake process 401 can relay the file to the addContent adapter, and the like. In another aspect, feed readers can be configured to read homogenous feeds, e.g., the entire feed is made up of the same type of files. Consequently the feed reader definition can be preset to always send to a particular ingest adapter.

Figure 5:
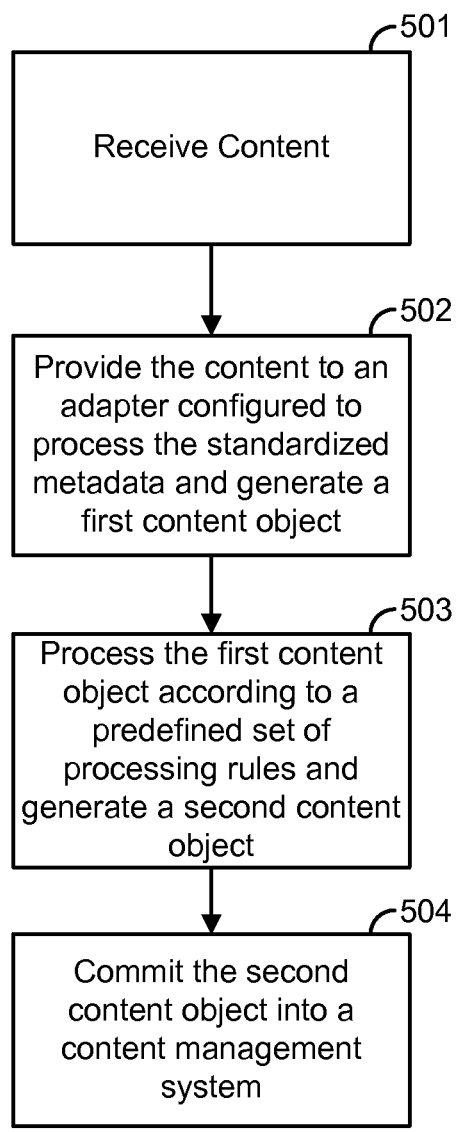
FIG. 5 is an example method for multiple phase content ingest.

In an aspect, illustrated in FIG. 5, provided are methods and systems for content ingest comprising receiving content at 501, wherein the content comprises standardized metadata, providing the content to an adapter configured to process the standardized metadata and generating a first content object at 502, processing the first content object according to a predefined set of processing rules and generating a second content object at 503, and committing the second content object into a content management system at 504.

It is contemplated that content can be received either automatically or manually. Content can comprise metadata alone and can further comprise audio and/or video. Content can also comprise non-standardized metadata. The methods can further comprise receiving content comprising metadata (standardized or non-standardized) which includes a location of associated audio and/or video content. The methods can further comprise retrieving the audio and/or video content according to the location information contained with the metadata. The methods can automatically retrieve content utilizing watch folders and/or feed readers as described herein.

The standardized metadata can adhere to any recognized standard method for describing content, for example, one or more of RSS, mRSS, AddContent, Cablelabs® ADI, TV-Anytime, and the like. The non-standardized metadata can comprise any custom tag, descriptor, information, etc., desired by a user that is absent or unused from a recognized standard. By way of example, the non-standardized metadata can comprise information to control media publication options or other workflow options, and any other information not supported by a recognized standard. The standardized metadata and the non-standardized metadata can be contained within a single metadata file comprised of standard elements and non-standard elements, or in multiple metadata files.

The adapter configured to process the standardized metadata can comprise extracting the incoming metadata by identifying standardized elements in the metadata as defined by a standard and mapping those to fields on the media object and/or embedded media file objects. The first content object can be a media object which can comprise one or more embedded media file objects as described herein. The first content object can be temporary and stored for as long as needed for further processing.

Processing the first content object according to a predefined set of processing rules can comprise manipulating the content, to include manipulating the standardized metadata and/or the non-standardized metadata. In another aspect, processing the first content object can comprise any operation that impacts ingest and publication of content. Examples include, but are not limited to, removing data from the metadata (standardized and/or non-standardized), preventing the content from being ingested, performing remapping on custom fields, adding new information to the metadata, controlling media publication options or other workflow options, enhancing existing information contained within the metadata, and the like.

The second content object can be a modified media object. A difference between the first and the second media object can be that the first is transient and subject to subsequent processing, while the second content object is the product of that manipulation, and can be persisted. The second content object contains the result of multiple phase ingest.

Committing the second content object into a content management system, or MP, can comprise storing the second content object in a database or otherwise making the object available to the system. In another aspect, a remote media processor can retrieve audio and/or video content associated with the metadata after the second content object is committed. In another aspect, the second content object comprises not only metadata, but also audio and/or video content, making further retrieval unnecessary.

Figure 6:
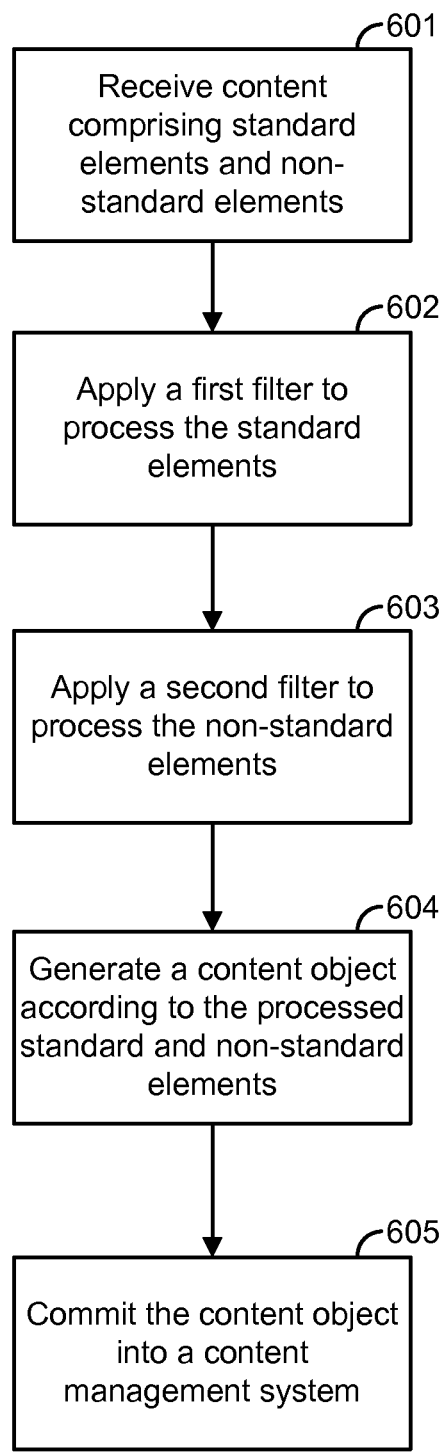
FIG. 6 is another example method for multiple phase content ingest.

In another aspect, illustrated in FIG. 6, provided are methods for content ingest comprising receiving content comprising standard elements and non-standard elements at 601, applying a first filter to process the standard elements at 602, applying a second filter to process the non-standard elements at 603, generating a content object according to the processed standard and non-standard elements at 604, and committing the content object into a content management system at 605. It is contemplated that content can be received either automatically or manually. Content can comprise metadata alone and can further comprise audio and/or video. In a further aspect, the content can comprise only standard elements, wherein applying a second filter to process the non-standard elements can be performed utilizing a predefined set of non-standard elements, resulting in the content object.

In an aspect, the standard elements can comprise tags corresponding to metadata adhering to a recognized standard, for example, one or more of RSS, mRSS, AddContent, Cablelabs® ADI, TV-Anytime, and the like. The non-standard elements can comprise tags corresponding to metadata that do not adhere to a recognized standard. The non-standard elements can be any custom tag, descriptor, information, etc., desired by a user that is absent or unused from a recognized standard. In an aspect, the standard and non-standard elements can be contained within a single content file. The standard and/or non-standard elements can include a location of associated audio and/or video content. The methods can further comprise retrieving the audio and/or video content according to the location information contained with the metadata. The methods can automatically retrieve content utilizing watch folders and/or feed readers as described herein.

Applying a first filter to process the standard elements can comprise identifying the standard elements as defined by a standard and mapping those to fields on the media object and/or embedded media file objects.

Applying a second filter to process the non-standard elements can comprise manipulating the content, to include manipulating the metadata arranged in the standardized format and/or the metadata arranged in the non-standardized format. In another aspect, processing the first content object can comprise any operation that impacts ingest and publication of content. Examples include, but are not limited to, removing data from the metadata, preventing the content from being ingested, performing remapping on custom fields, adding new information to the metadata, controlling media publication options or other workflow options, enhancing existing information contained within the metadata, and the like. In an aspect, the second filter can modify and/or add elements and/or values not present in the received content.

The content object can be a media object which can comprise one or more embedded media file objects as described herein. In an aspect, generating a content object can comprise generating one or more temporary content objects for filter application.

Committing the content object into a content management system, or MP, can comprise storing the content object in a database. In another aspect, a remote media processor can retrieve audio and/or video content associated with the metadata after the content object is committed. In another aspect, the content object comprises not only metadata, but also audio and/or video content, making further retrieval unnecessary.

Figure 7:
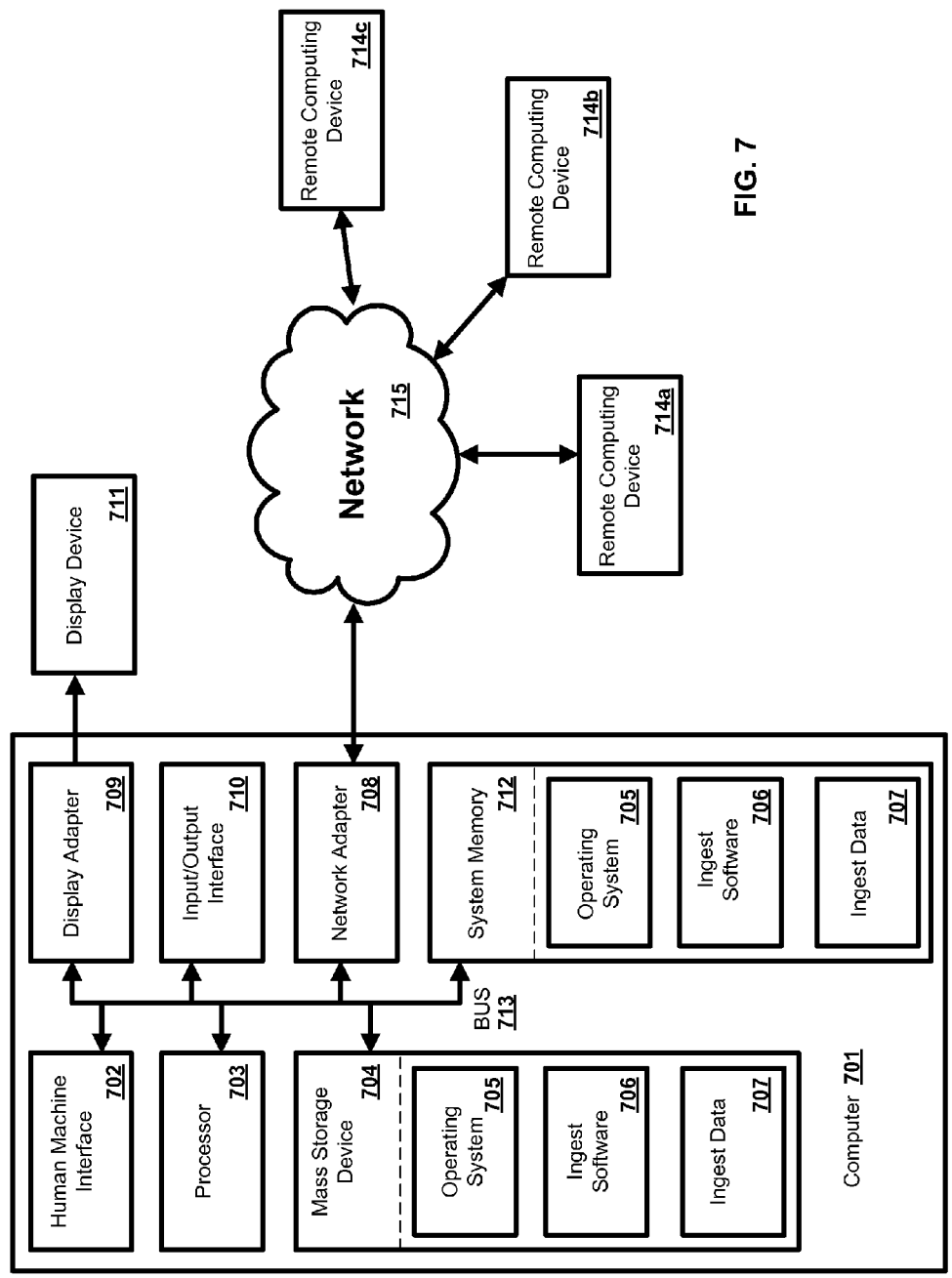
FIG. 7 is an example operating environment.

In an exemplary aspect, the methods and systems can be implemented on a computer 701 as illustrated in FIG. 7 and described below. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, ingest software 706, ingest data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as ingest data 707 and/or program modules such as operating system 705 and ingest software 706 that are immediately accessible to and/or are presently operated on by the processing unit 703.

In another aspect, the computer 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computer 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and ingest software 706. Each of the operating system 705 and ingest software 706 (or some combination thereof) can comprise elements of the programming and the ingest software 706. Ingest data 707 can also be stored on the mass storage device 704. Ingest data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computer 701 can have more than one display adapter 709 and the computer 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computer 701 via Input/Output Interface 710. Any step and/or result of the methods can be output in any form to an output device. Such output can be any form of visual representation, including, but not limited to, textual, graphical, animation, audio, tactile, and the like. The display 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of ingest software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for managing content, comprising:
   receiving content, wherein the content comprises standardized metadata and non-standardized metadata;
   providing the content to a first adapter configured to process the standardized metadata and generating a first content object;
   providing the first content object to a second adapter configured to process the non-standardized metadata and generating a second content object;
   processing the second content object according to a predefined set of processing rules and generating a third content object; and
   providing the third content object to a content management system.

2. The method of claim 1, wherein the standardized metadata adheres to one or more of RSS, mRSS, AddContent, Cablelabs® ADI, or TV-Anytime standards.

3. The method of claim 1, wherein the content comprises one or more of audio and video.

4. The method of claim 1, wherein one or more of the standardized metadata and non-standardized metadata comprises a location of associated audio and/or video.

5. The method of claim 4, further comprising automatically retrieving associated audio and/or video from the location.

6. The method of claim 1, wherein providing the content to an adapter configured to process the standardized metadata comprises extracting the standardized metadata as defined by a standard and mapping the standardized metadata to fields on the first content object.

7. The method of claim 1, wherein processing the third content object according to a predefined set of processing rules comprises manipulating the content.

8. The method of claim 7, wherein manipulating the content comprises one or more of,
   removing data from the standardized metadata and/or the non-standardized metadata,
   preventing the content from being ingested,
   performing remapping on custom fields,
   adding new information to the standardized metadata and/or the non-standardized metadata,
   controlling media publication options or other workflow options, and
   enhancing existing information contained within the standardized metadata and/or the non-standardized metadata.

9. The method of claim 1, wherein providing the third content object to a content management system comprises storing the third content object in a database.

10. A method for managing content, comprising:
    receiving content comprising standard elements and non-standard elements;
    applying a first filter to process the standard elements;
    applying a second filter to process the non-standard elements;
    generating a content object according to the processed standard and non-standard elements; and
    providing the content object to a content management system.

11. The method of claim 10, wherein the content comprises one or more of audio and video.

12. The method of claim 10, wherein one or more of standard elements or non-standard elements comprises a location of associated audio and/or video.

13. The method of claim 12, further comprising automatically retrieving associated audio and/or video from the location.

14. The method of claim 10, wherein applying a first filter to process the standard elements comprises extracting the standard elements as defined by a standard and mapping the standard elements to fields on a content object.

15. The method of claim 10, wherein applying a second filter to process the non-standard elements comprises manipulating the content.

16. The method of claim 15, wherein manipulating the content comprises controlling media publication options or other workflow options.

17. The method of claim 10, wherein providing the content object to a content management system comprises storing the content object in a database.

18. A system for managing content, comprising:
    a memory; and
    a processor, coupled to the memory, wherein the processor is configured for performing steps comprising,
       receiving content, wherein the content comprises standardized metadata and non-standardized metadata;
       providing the content to a first adapter configured to process the standardized metadata and to a second adapter configured to process the non-standardized metadata, resulting in a temporary content object;

processing the temporary content object according to a predefined set of processing rules, resulting in a second content object; and providing the second content object to a content management system.

19. The system of claim 18, wherein processing the temporary content object according to a predefined set of processing rules comprises manipulating the content.

20. The system of claim 19, wherein manipulating the content comprises one or more of, removing data from the standardized metadata and/or the non-standardized metadata, preventing the content from being ingested, performing remapping on custom fields, adding new information to the standardized metadata and/or the non-standardized metadata, controlling media publication options or other workflow options, and enhancing existing information contained within the standardized metadata and/or the non-standardized metadata.

* * * * *

UNITED STATES PATENT AND TRADEMARK OFFICE
CERTIFICATE OF CORRECTION

PATENT NO. : 8,782,060 B2
APPLICATION NO. : 13/446535
DATED : July 15, 2014
INVENTOR(S) : Paul Meijer et al.

It is certified that error appears in the above-identified patent and that said Letters Patent is hereby corrected as shown below:

Please amend the title page of the issued patent to read:

(75) Inventors: Paul Meijer, Seattle, WA (US);
Mark Hellkamp, Seattle, WA (US)

IN THE SPECIFICATION

In column 1, line 51, replace "FIG. 2 is example metadata;" with -- FIG. 2 is an example of metadata; --

In column 2, lines 47-48, replace "description" with -- descriptions --

In column 5, lines 14-17, replace "An ingest adapter can be configured to process customized metadata that do not adhere to a recognized standard. For example, metadata that is generated according to user preferences." with -- An ingest adapter can be configured to process customized metadata that does not adhere to a recognized standard; for example, metadata that is generated according to user preferences. --

In column 5, line 55-56, replace "can thus can be embedded" with -- thus can be embedded --

In column 11, line 27, replace "it is no way" with -- it is in no way --

Signed and Sealed this
Thirtieth Day of June, 2015

Michelle K. Lee
*Director of the United States Patent and Trademark Office*